(12) United States Patent
Roverato

(10) Patent No.: US 11,199,332 B2
(45) Date of Patent: Dec. 14, 2021

(54) BRACKET FOR WALLS

(71) Applicant: RODIGAS S.R.L, Padua (IT)

(72) Inventor: Francesco Roverato, Padua (IT)

(73) Assignee: RODIGAS S.R.L., Limena (IT)

( * ) Notice: Subject to any disclaimer, the term of this patent is extended or adjusted under 35 U.S.C. 154(b) by 41 days.

(21) Appl. No.: 16/720,255

(22) Filed: Dec. 19, 2019

(65) Prior Publication Data
US 2021/0080127 A1 Mar. 18, 2021

(30) Foreign Application Priority Data

Sep. 16, 2019 (IT) .................. 102019000016346

(51) Int. Cl.
*F24F 1/62* (2011.01)
*F16M 13/02* (2006.01)

(52) U.S. Cl.
CPC ............ *F24F 1/62* (2013.01); *F16M 13/022* (2013.01); *F16M 2200/06* (2013.01)

(58) Field of Classification Search
CPC ............ F24F 1/62; F24F 13/32; A47B 96/067
See application file for complete search history.

(56) References Cited

U.S. PATENT DOCUMENTS

| | | | | | |
|---|---|---|---|---|---|
| 4,048,768 | A | * | 9/1977 | Good | A47B 57/40 52/36.6 |
| 4,949,924 | A | * | 8/1990 | Carmody | A47G 7/044 248/215 |
| 5,524,727 | A | * | 6/1996 | Yennie, Jr. | E04G 3/20 182/82 |
| 5,553,823 | A | * | 9/1996 | Protz, Jr. | A01G 5/04 248/215 |
| 5,615,783 | A | * | 4/1997 | Warnken | B68C 1/002 211/104 |
| 5,855,279 | A | * | 1/1999 | Klein | A47F 5/0846 211/35 |
| 5,875,902 | A | * | 3/1999 | Emery | A47B 96/16 211/90.03 |
| 6,109,461 | A | * | 8/2000 | Kluge | A47B 57/30 211/103 |
| 6,145,678 | A | * | 11/2000 | Morrison | A47B 53/00 211/113 |

(Continued)

FOREIGN PATENT DOCUMENTS

| | | | | |
|---|---|---|---|---|
| EP | 0553880 A2 | * | 8/1993 | ............. F24F 1/62 |
| EP | 1914484 A2 | * | 4/2008 | ............. F24F 1/62 |
| WO | WO-03016790 A1 | * | 2/2003 | ............. F24F 13/32 |

*Primary Examiner* — Eret C McNichols
(74) *Attorney, Agent, or Firm* — Arent Fox LLP; Michael Fainberg

(57) ABSTRACT

A bracket adapted to be attached to a wall, comprises a transverse support element and at least one support bracket. The at least one support bracket has an L-shape comprising an attachment arm and a support arm. The attachment arm comprises a first end provided with fastening means to said transverse support element and a second end adapted to couple with a corresponding end of the support arm. The attachment arm comprises a first portion and a second portion. The first portion and the second portion are connected to each other by means of hinging means, suitable for allowing a rotation and a relative translation between the first portion and the second portion.

8 Claims, 5 Drawing Sheets

(56) References Cited

U.S. PATENT DOCUMENTS

| | | | | |
|---|---|---|---|---|
| 7,118,001 B2* | 10/2006 | Klein | ............... | A47B 81/02 |
| | | | | 211/90.03 |
| 7,264,083 B2* | 9/2007 | Wilcox | ............... | E04G 5/062 |
| | | | | 182/82 |
| 7,387,212 B2* | 6/2008 | Costa | ............... | A47B 47/022 |
| | | | | 211/90.01 |
| 7,506,772 B2* | 3/2009 | Chen | ............... | A47B 95/008 |
| | | | | 211/103 |
| 7,748,195 B2* | 7/2010 | Keith | ............... | E04G 5/04 |
| | | | | 52/745.21 |
| 7,900,783 B2* | 3/2011 | Fernandez | ............... | A47B 57/42 |
| | | | | 211/90.02 |
| 8,177,079 B2* | 5/2012 | Schwartzkopf | ............... | A47F 5/0838 |
| | | | | 211/103 |
| 8,196,705 B2* | 6/2012 | Jejina | ............... | E04G 1/38 |
| | | | | 182/150 |
| 8,434,629 B2* | 5/2013 | Fernandez | ............... | A47B 57/42 |
| | | | | 211/94.01 |
| 8,646,624 B2* | 2/2014 | Fernandez | ............... | A47B 57/42 |
| | | | | 211/90.02 |
| 9,482,020 B2* | 11/2016 | Hayman | ............... | E04G 5/006 |
| 9,770,122 B2* | 9/2017 | Gonzalez | ............... | A47B 96/027 |
| 2003/0234231 A1* | 12/2003 | Rowe | ............... | A47B 96/067 |
| | | | | 211/90.02 |
| 2005/0247651 A1* | 11/2005 | Craft | ............... | A47B 96/00 |
| | | | | 211/59.3 |
| 2006/0011568 A1* | 1/2006 | Remmers | ............... | A47B 96/028 |
| | | | | 211/94.01 |
| 2007/0056799 A1* | 3/2007 | Leidner | ............... | E04G 5/062 |
| | | | | 182/82 |
| 2007/0241072 A1* | 10/2007 | Bryant | ............... | A47B 96/061 |
| | | | | 211/90.02 |
| 2007/0257169 A1* | 11/2007 | Taggett | ............... | A47B 96/06 |
| | | | | 248/220.41 |
| 2008/0237426 A1* | 10/2008 | Walters | ............... | H04N 5/64 |
| | | | | 248/316.8 |
| 2011/0073746 A1* | 3/2011 | Padiotis | ............... | F24F 1/50 |
| | | | | 248/674 |
| 2011/0132853 A1* | 6/2011 | Drobot | ............... | A47B 57/562 |
| | | | | 211/42 |
| 2011/0198461 A1* | 8/2011 | Truckor | ............... | A47B 96/06 |
| | | | | 248/205.1 |
| 2013/0299439 A1* | 11/2013 | Sid | ............... | A47F 11/10 |
| | | | | 211/134 |
| 2015/0107277 A1* | 4/2015 | Moore | ............... | F24F 13/32 |
| | | | | 62/77 |
| 2015/0211549 A1* | 7/2015 | Yazykov | ............... | F04D 29/669 |
| | | | | 248/674 |
| 2016/0123625 A1* | 5/2016 | Crowley | ............... | F24F 13/32 |
| | | | | 248/636 |
| 2018/0132611 A1* | 5/2018 | Lu | ............... | A47B 57/42 |
| 2020/0400321 A1* | 12/2020 | Bosa | ............... | F24F 1/62 |

* cited by examiner

BRACKET FOR WALLS

CROSS-REFERENCE TO RELATED APPLICATION

This application claims priority to Italian Patent Application No. 102019000016346 filed Sep. 16, 2019, the entire contents of which is hereby incorporated in its entirety by reference.

FIELD OF APPLICATION

The present invention relates to a bracket for walls. In particular, the present invention relates to a bracket for external walls of buildings, intended to support external conditioning units.

BACKGROUND OF THE INVENTION

As is known, external conditioning units are usually arranged on brackets fixed on an external wall of a building.

In this discussion reference will be made to a particular application of the bracket, that is, to a bracket intended to support an external conditioning unit. This reference is provided only for explanatory purposes, since the principles and advantages of the present invention may also be applied to other types of uses, as will be apparent from the continuation of the present description.

The bracket generally comprises two L-shaped support brackets which can be attached directly to the wall, or they can be attached to a common transverse support element. The present invention relates in particular to the type of bracket which comprises a transverse support element.

The L-shaped support bracket comprises an attachment arm intended to be attached to the transverse support element, and a support arm on which the external conditioning unit is placed and fixed.

The arrangement of the bracket generally comprises two steps: attachment of the transverse support element to the external wall, and the mounting the two support brackets on the transverse support element.

The two support brackets are mounted on the transverse support element by hooking one end of the bracket attachment arm at a seat arranged on the transverse support element.

This solution is particularly used and appreciated, however it is not free from drawbacks, which relate for example to the use of this type of support bracket with certain types of walls.

In fact, the construction techniques of the houses can be different, also in relation to the shape of the external walls of the buildings.

For example, in a construction technique very common in the USA, the walls are provided with horizontal sloping wood panel.

In this case, the transverse support element must necessarily be fixed on an inclined wood panel, so that its orientation is different with respect to the case with vertical wall, and in particular inclined upwards. When the L-shaped support brackets are inserted into the transverse support element, these remain inclined and raised with respect to the wall, as a consequence of the orientation of the transverse support element.

In the brackets of the prior art, this problem is solved by adopting specific configurations for the transverse support element, or through shaped shims which are applied between the transverse element and the wall.

For this reason, the manufacturer is forced to have a plurality of components in the catalogue depending on the geometry of the wall on which the bracket will be mounted.

Furthermore, the installer must pay close attention to the inclination of the transverse element, so that the support brackets have the correct positioning with respect to the wall.

SUMMARY OF THE INVENTION

The need of solving the drawbacks and limitations mentioned with reference to the prior art is therefore felt.

Therefore, the need is felt to provide a bracket that can be adapted to different wall geometries to which it will be attached.

Furthermore, the need is felt for a bracket that is made as much as possible by assembling standard components, both for warehouse needs, and for simplicity of installation.

Such a need is met by a bracket for walls according to claim 1.

BRIEF DESCRIPTION OF THE DRAWINGS

Further features and advantages of the present invention will appear more clearly from the following description of preferred non-limiting embodiments thereof, in which.

Elements or parts of elements in common to the embodiments described below are referred to with the same reference numerals.

DETAILED DESCRIPTION

Figure 1:
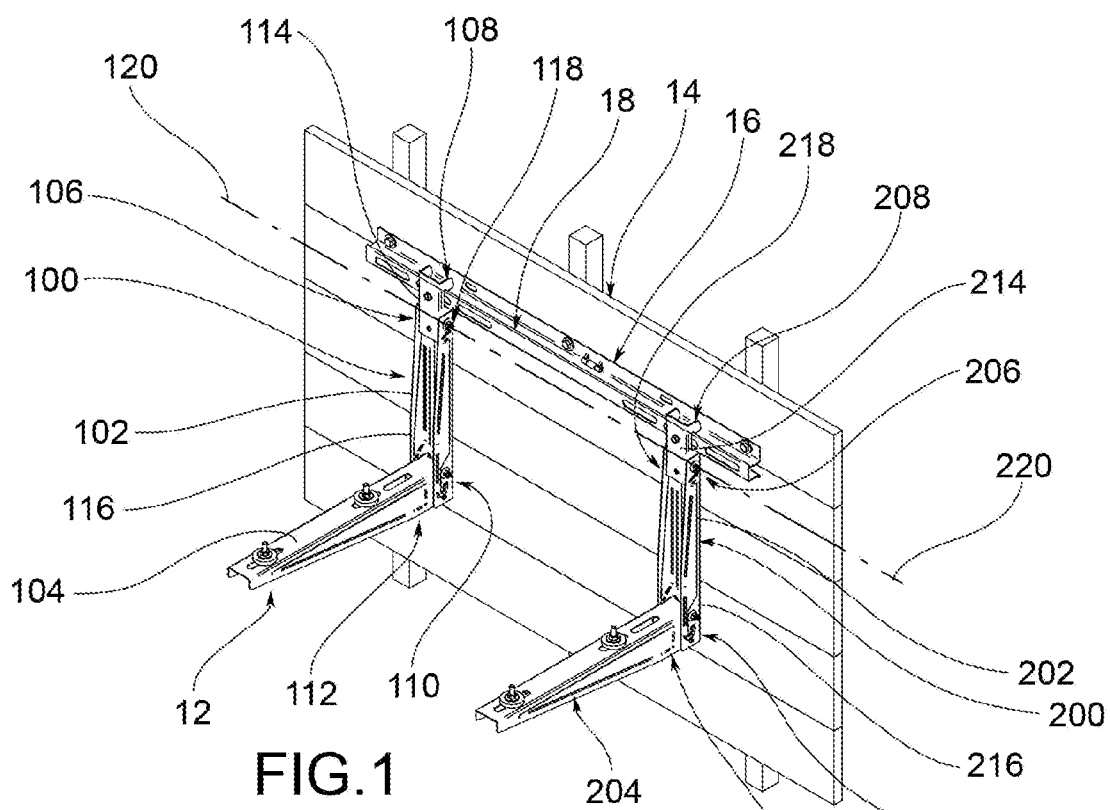
FIG. 1 schematically shows a perspective view of a bracket according to the present invention in a first mounting condition.
Figure 2:
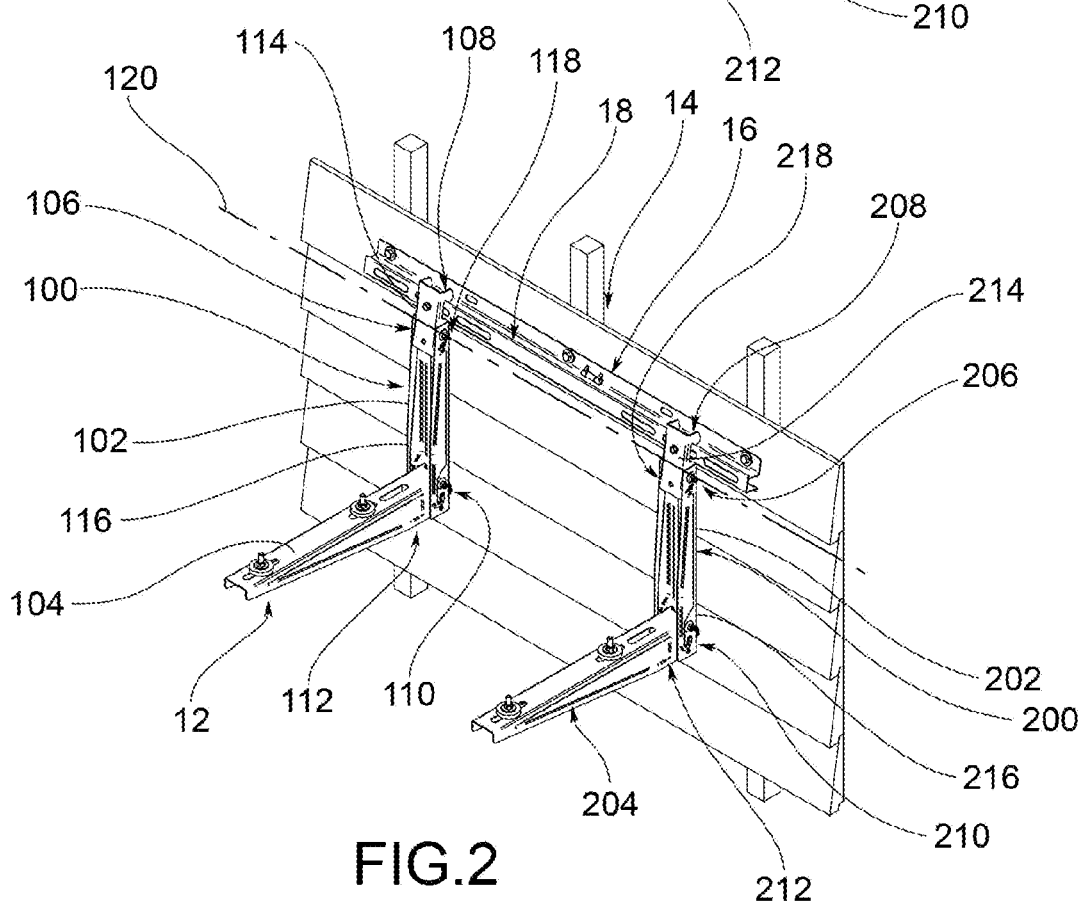
FIG. 2 schematically shows a perspective view of a bracket according to the present invention in a second mounting condition.

In FIGS. 1 and 2, with reference numeral 12, a bracket according to the present invention is generally indicated.

The bracket 12 is adapted to be attached to a wall 14 and it comprises a transverse support element 16 and at least one support bracket 100, 200. In the appended embodiments, the bracket is always represented in the embodiment which comprises two support brackets 100, 200, however this reference is for explanatory purposes only. In fact, even if not illustrated, embodiments comprising one support bracket, or more than two support brackets, for example three, are possible.

The at least one support bracket 100, 200 has an L-shape comprising an attachment arm 102, 202 and a support arm 104, 204.

The attachment arm 102, 202 comprises:
- a first end 106, 206, which is provided with fastening means 108, 208 to the transverse support element 16, and
- a second end 110, 210 adapted to be coupled with a corresponding end 112, 212 of the support arm 104, 204.

The attachment arm 102, 202 comprises a first portion 114, 214 and a second portion 116, 216 which are connected to each other by hinging means 118, 218. The hinging means 118, 218 are suitable to allow a rotation and a relative translation between the first portion 114, 214 and the second portion 116, 216.

The hinging means 118, 218 define a hinge axis 120, 220 about which the relative rotation between the first portion 114, 214 and a second portion 116, 216 takes place.

In this way, the first portion 114, 214 can be provided on the transverse support element 16 and, in the case of an inclined wall (i.e. wall comprising a surface with inclined wood panels), it will assume an inclined orientation with respect to the wall 14 following the inclination of the transverse support element 16. Thanks to the hinging means 118, the second portion 116, 216 can rotate and translate relative to the first portion 114, 214 and can therefore assume a correct configuration, parallel to the development plane of the wall 14.

Figure 4:
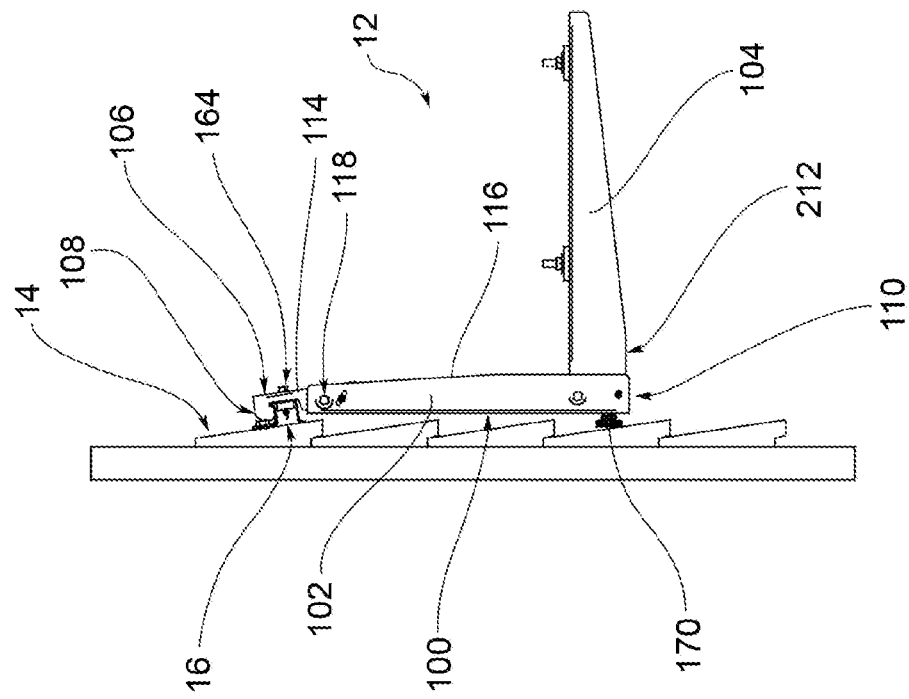
FIG. 4 schematically shows a lateral view of the bracket shown in FIG. 2.
Figure 3:
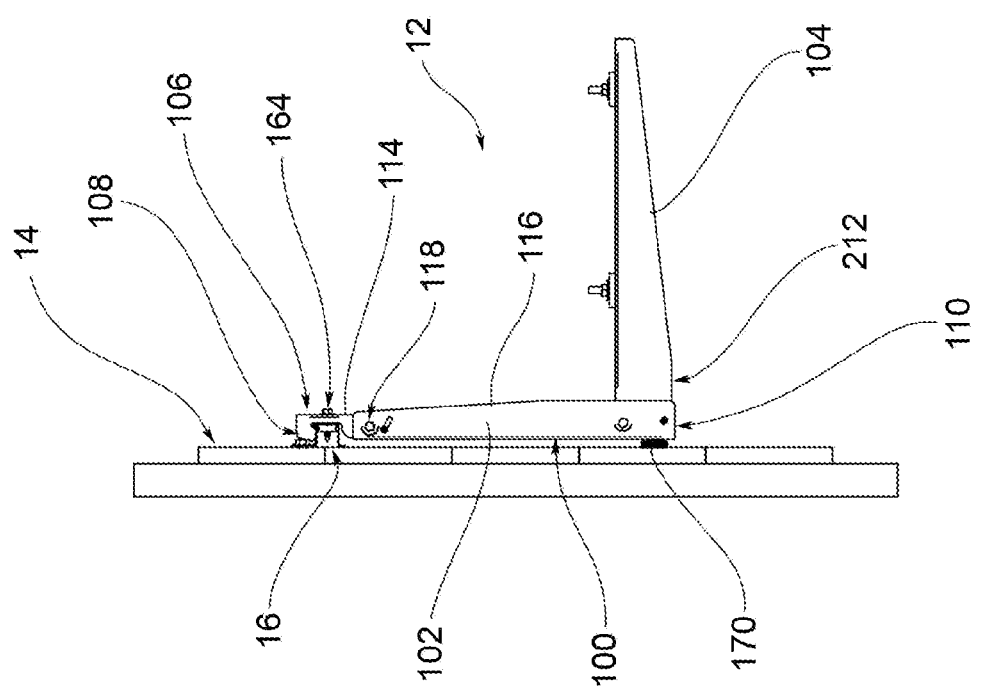
FIG. 3 schematically shows a lateral view of the bracket shown in FIG. 1.

Two possible configurations can be seen in the examples of FIGS. 3 and 4. In FIG. 3, the fastening of the transverse support element 16 takes place with the arrangement substantially parallel to the development plane of the wall 14, while in FIG. 4, it can be seen that the fastening of the support element 16 takes place with a substantially inclined position with respect to the development plane of the wall, since the wall 14 of the example of FIG. 4 is made by sloping inclined wood panel.

The hinge axis 120, 220 can be substantially parallel to the transverse support element 16. As can be seen in FIGS. 1-4, the transverse support element 16 is fixed on the wall with an orientation substantially parallel to the position that the conditioning unit to be supported must have in use. However, in particular applications, the transverse support element 16 can be oriented differently.

The attachment arm 102, 202 and the support arm 104, 204 can be obtained from a metal sheet suitably shaped and bent.

Figure 5:
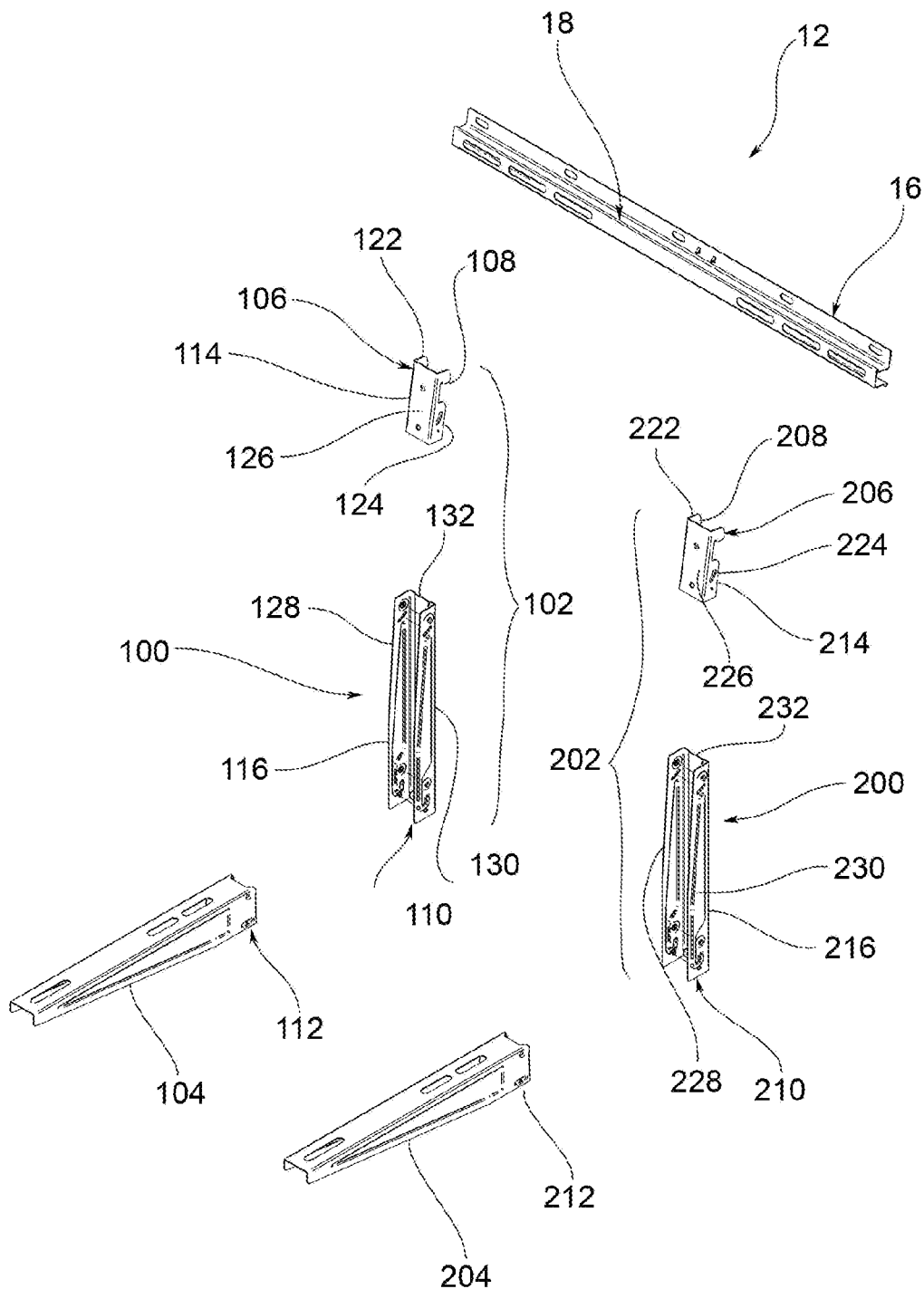
FIG. 5 schematically shows an exploded view of a bracket according to the present invention.

As can be seen in FIG. 5, the first portion 114, 214 and the second portion 116, 216 can have a U-shaped section. In operating conditions, which are seen for example in FIGS. 1 and 2, the first portion 114, 214 and the second portion 116, 216 can have an opposite orientation to each other.

As can be seen in FIGS. 1 and 2, the first portion 114, 214 and the second portion 116, 216 can be partially superimposed on each other and inserted one into the other, thanks to the fact that one of the two portions has a section with smaller dimensions than the other and therefore can be received inside the portion with section having greater dimensions.

Figure 6:
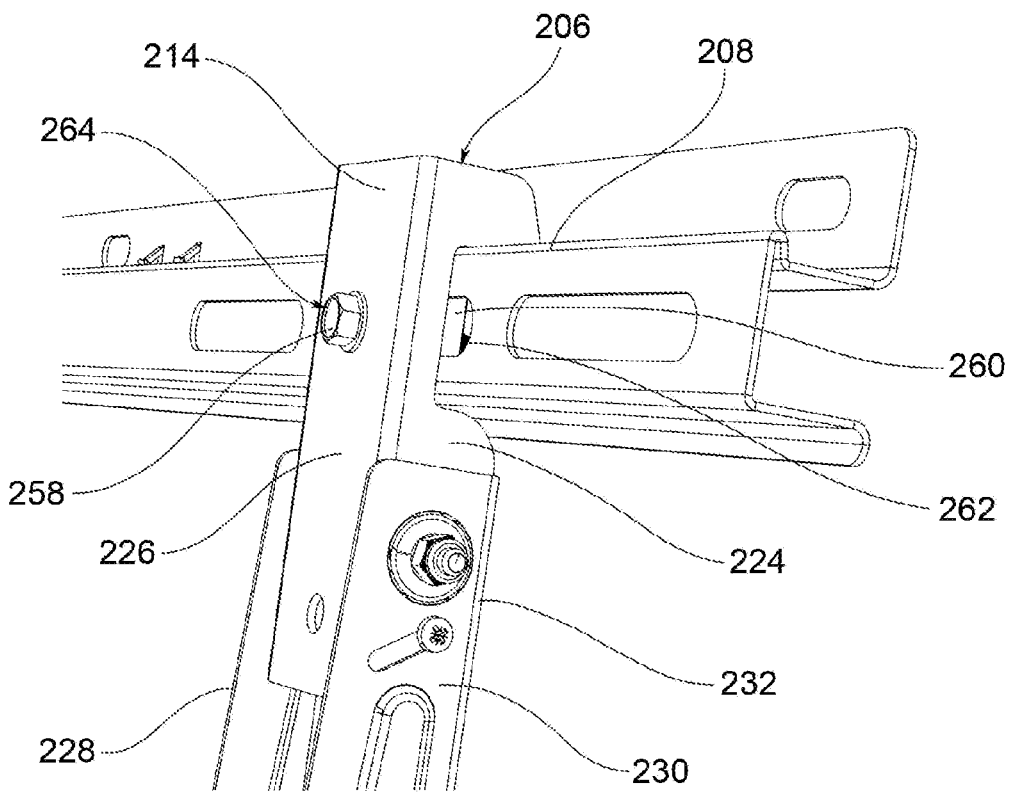
FIG. 6 schematically shows a perspective view of an enlarged portion of a bracket according to the present invention.
Figure 7:
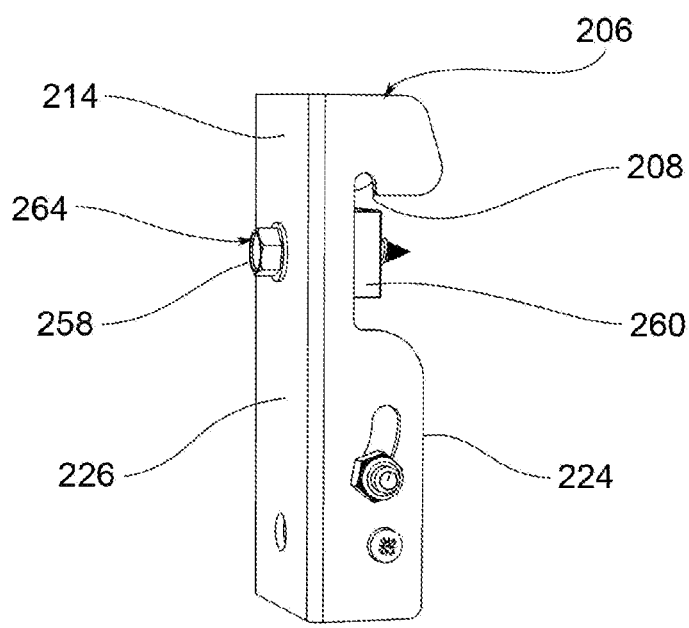
FIG. 7 shows an enlarged perspective view of a component of a bracket according to the present invention.

With reference to the example of FIG. 6, which represents in schematic form the first end 106 of the support bracket 100, it can be seen that the bulk of the U-shaped section of the first portion 114 is smaller than the bulk of the second portion 116.

In other words, the first portion 114, 214 can have a U-shaped section comprising two wings 122, 124; 222, 224, and a connection 126, 226. Moreover, the second portion 116, 216 can have a U-shaped section comprising two wings 128, 130; 228, 230 and a connection 132, 232. As shown in the embodiment shown in FIG. 8, the first portion 114, 214 can be partially inserted inside the second portion 116, 216, thanks to the fact that the connection 126, 226 of the first portion 114, 214 can have a shorter length than the connection 132, 232 of the second portion 116, 216.

According to a possible embodiment, the hinging means 118, 218 can be made by coupling together corresponding wings of the U-shaped section of the first portion 114, 214 and of the second portion 116, 216.

For example, in the embodiment shown in FIG. 5, the wing 122, 222 of the first portion 114, 214 is coupled to the wing 128, 228 of the second portion 116, 216, while the wing 124, 224 of the first portion 114, 214 is coupled to the wing 130, 230 of the second portion 116, 216.

Figure 8:
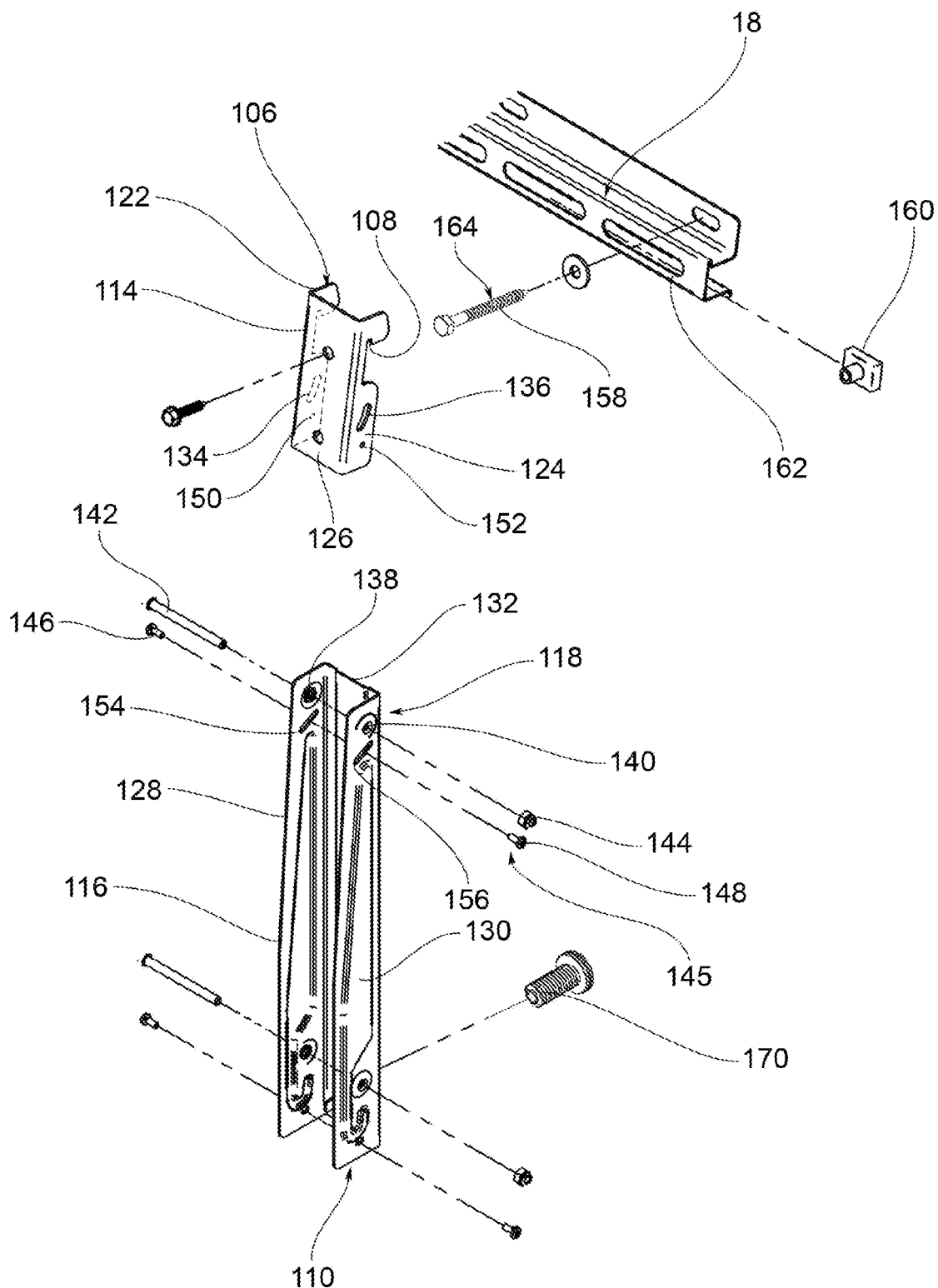
FIG. 8 schematically shows a perspective view of a portion of an exploded view of a bracket according to the present invention.

With reference to FIG. 8, a possible embodiment of the hinging means 118 which connects the first portion 114 to the second portion 116 will be described, bearing in mind that the hinging means 218 connecting the first portion 214 to the second portion 216 can be made in the same way.

As indicated above, also in the embodiment shown in FIG. 8, the wing 122 of the first portion 114 is coupled to the wing 128 of the second portion 116, while the wing 124 of the first portion 114 is coupled to the wing 130 of the second portion 116.

According to a possible embodiment, the coupling can take place by means of a bolt 144 and a respective screw 142 passing through the wings 128, 122, 124, 130.

In a possible embodiment, not shown in the accompanying figures, the wings 128, 122, 124, 130 can be provided with holes suitable for being aligned.

As shown in the embodiment shown in FIG. 8, the wings 122, 124 of the first portion 114 can be provided with slits 134, 136, and the wings 128, 130 of the second portion 116 can be provided with respective holes 138, 140.

In this way, the position of the second portion 116 can be adapted with respect to the first portion 114 not only through a rotation, but also with a translation, thanks to the movement of the screw 142 inside the slits 134, 136.

According to a possible embodiment, the slits 134, 136 can have a development substantially along a curved section, for example a circumference. Advantageously, the slits 134, 136 may have a concave position towards the outside of the bracket.

According to a possible alternative embodiment, the position of the holes 138, 140 and the slits 134, 136 could be inverted: the slits can be positioned at the second portion 116, while the holes can be arranged at the first portion 114.

Advantageously, the use of the slits 134, 136 allows effectively positioning the screw inside the slit itself. This positioning allows, for example, preventing deformations due to the presence of limited material between the slit and the edge of the component.

According to a possible embodiment, the hinging means 118 can also comprise locking means 145.

The locking means 145 can comprise at least one locking slit 154, 156 arranged at a wing 128, 130 of the second portion 116, and at least one corresponding locking hole 150, 152 arranged at a wing 122, 124 of the first portion 114. Locking slit 154, 156 and locking hole 150, 152 are adapted to be engaged by a locking screw 146, 148 suitable for screwing at the locking hole 150, 152.

According to a possible embodiment, the locking means 145 can comprise a locking slit 154, 156, a locking hole 150, 152 and a locking screw 146, 148 for each pair of juxtaposed wings.

Advantageously, the locking means 145 can be arranged near the hinge axis 120.

According to alternative embodiments, not shown in the accompanying figures, the locking means 145 can be made differently. For example, the locking slit 154, 156 can be replaced with a plurality of holes, suitable for guaranteeing a plurality of locking positions.

Advantageously, once the mutual position between the first portion and the second portion is adjusted, the position can be locked through the locking means 145.

As previously mentioned, the fastening means 108, 208 are arranged on the first portion 114, 214.

According to a possible embodiment, the fastening means 108, 208 can be for example a hook, suitable for coupling with a corresponding fixing seat 18 arranged at the transverse support element 16. The attachment seat 18 can extend along the transverse support element 16. According to a possible embodiment, the attachment seat 18 can be, for example, a U-shaped seat with an upward facing opening, in use, so that the fastening means 108, 208 can be housed therein.

According to a possible embodiment, the attachment seat 18 can be formed by folding a metal sheet.

According to a possible embodiment, the fastening means 108, 208 can comprise a hook portion, adapted to partially contain a longitudinal portion of the attachment seat 18. An example of containment is shown in FIG. 6.

The fastening means can also comprise a locking device 164, 264 of the first portion 114, 214 to the transverse support element 16. According to a possible embodiment, the locking device 164, 264 can comprise a screw 158, 258 adapted to be inserted into a hole made in a hole of the first portion 114, 214 and an opening 262 made at the transverse support element 16, to screw onto a corresponding abutment block. In this way, once the first portion has been positioned at the transverse support element 16, it is possible to insert the screw 158, 258 inside the hole of the first portion and of the corresponding opening 162, 262 on the transverse support element, and screw the screw to the abutment block 160.

In the proximity of the second end 110, 210 of the fastening arm 102, 202, and therefore at the second portion 116, 216 an adjustable spacer 170 can be arranged.

The function of the adjustable spacer is to adjust the distance between the fastening arm 102, 202 and the wall 14 at the second end 110, 210.

Thus, the adjustable spacer 170, when present, is adapted to protrude from the surface of the fastening arm 102, 202 which is in use facing the wall 14.

According to a possible embodiment, the adjustable spacer can comprise a threaded body, suitable for screwing into a corresponding hole made on the attachment arm, and a support head, intended to rest on a wall 14.

As regards the second end 116, 216 of the fastening arm 102, 202, the connection between the fixing arm 102, 202 and the support arm 104, 204 can be fixed. For example, the second portion 116, 216 of the fastening arm 102, 202 and support arm 104, 204 can be made in one piece.

According to a possible embodiment, the fastening arm and the support arm can be connected to each other by hinging means which allow a certain relative rotation between the two elements (for example 90°).

Advantageously, the support arm, in a manner known per se, can be made by bending a metal sheet.

On the support arm there can be arranged in a per se known manner means for locking an external unit of a conditioner in position.

The advantages that can be achieved with the present invention are now apparent.

First of all, a bracket is provided which allows an automatic adaptation based on the type of wall on which it is to be fixed.

Furthermore, precisely because the bracket allows an adaptation, it can be used in the presence of different wall conformations. In particular, it is possible to use the same type of bracket both on a substantially flat wall and on walls made of inclined wood panel.

Furthermore, there is a further advantage for the manufacturer and the fitter, since it is not necessary to have specific adaptation means available, or parts specifically designed for particular types of walls.

A man skilled in the art may make several changes and/or replacements of elements described with equivalent elements to the embodiments described above in order to meet specific needs, without departing from the scope of the appended claims.

The invention claimed is:

1. Bracket adapted to be attached to a wall, comprising a transverse support element and at least one support bracket; said at least one support bracket having an L-shape comprising an attachment arm and a support arm;
   said attachment arm comprising a first end provided with fastening means to said transverse support element and a second end adapted to couple with a corresponding end of the support arm;
   characterised in that
   said attachment arm comprises a first portion and a second portion, said first portion and said second portion being connected to each other by means of hinging means, said hinging means being suitable to allow a rotation and relative translation between the first portion and the second portion, said first portion has a U-section comprising two wings, and a connection; said second portion has a U-section comprising two wings, and a connection; in operating conditions said first portion and said second portion having an opposite orientation to each other, the wing of the first portion is coupled to the wing of the second portion, while the wing of the first portion is coupled to the wing of the second portion, said hinging means comprising a screw and a respective bolt passing through the wings.

2. Bracket according to the claim 1, characterised in that said hinging means comprise a hinge axis substantially parallel to the transverse support element.

3. Bracket according to the claim 1, characterised in that the wings of the first portion are provided with slits and the wings of the second portion can be provided with respective holes.

4. Bracket according to claim 1, characterised in that the hinge means comprise locking means comprising at least one locking slit arranged at a wing of the second portion, and at least one corresponding locking hole arranged at a wing of the first portion; said locking slit and said locking hole are suitable to be engaged by a locking screw suitable to screw into the locking hole.

5. Bracket according to the claim 4, characterised in that said locking means are arranged in proximity to the hinge axis.

6. Bracket according to claim 1, characterised in that the fastening means are a hook, suitable to couple with a corresponding attachment seat provided at the transverse support element.

7. Bracket according to claim 1, characterised in that it comprises an adjustable spacer in the proximity of the second end of the attachment arm and therefore at the second portion.

8. Bracket according to claim 7, characterized in that said adjustable spacer is adapted to project from the surface of the attachment arm which in use faces the wall, said adjustable spacer comprising a threaded body, adapted to screw into a corresponding hole made on the attachment arm, and a support head designed to rest on the wall.

* * * * *

UNITED STATES PATENT AND TRADEMARK OFFICE
CERTIFICATE OF CORRECTION

Page 1 of 1

PATENT NO. : 11,199,332 B2
APPLICATION NO. : 16/720255
DATED : December 14, 2021
INVENTOR(S) : Francesco Roverato It is certified that error appears in the above-identified patent and that said Letters Patent is hereby corrected as shown below:

On the Title Page

(71) The Applicant reads:
"RODIGAS S.R.L, Padua (IT)"

Should read:
--RODIGAS S.R.L, Limena (IT)--

(72) The Inventor reads:
"Francesco Roverato, Padua (IT)"

Should read:
--Francesco Roverato, Limena (IT)--

Signed and Sealed this
Twelfth Day of April, 2022

Drew Hirshfeld
*Performing the Functions and Duties of the
Under Secretary of Commerce for Intellectual Property and
Director of the United States Patent and Trademark Office*